Patented Jan. 10, 1950

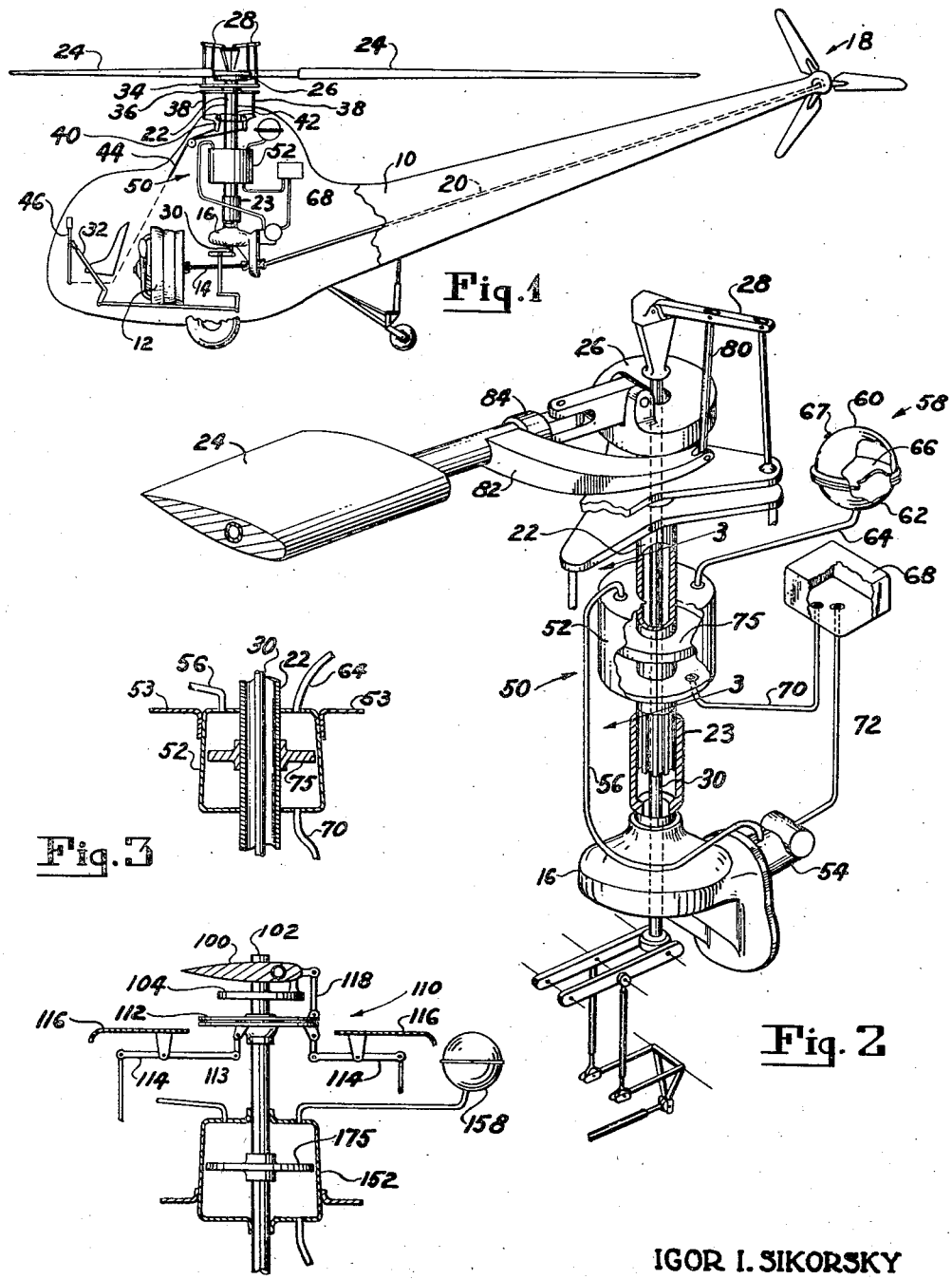

2,494,209

UNITED STATES PATENT OFFICE 2,494,209

ROTOR SUPPORT

Igor I. Sikorsky, Bridgeport, Conn., assignor to United Aircraft Corporation, East Hartford, Conn., a corporation of Delaware Application June 12, 1945, Serial No. 599,006

11 Claims. (Cl. 170—135.7)

1

This invention relates generally to resilient damping mounting means for aircraft sustaining parts, and more particularly to a rotor support including automatic shock absorbing and pitch reduction means responsive to variations in rotor loading for controlling the attitude of the rotor.

An object of this invention is to provide in a helicopter a damping mount for the rotor thereof including means for providing a low spring rate suspension for the helicopter for minimizing shock forces by permitting the rotor to move relative to the body of the helicopter.

Another object is to provide in combination with damping and force absorbing means, means for automatically changing the pitch of one or more blades of the rotor to vary the lift thereof to render the system self-regulating.

A further object is to provide improved mounting and damping and automatic control means for aircraft.

Other objects reside in the details of construction, and the arrangement of parts and will be either obvious or pointed out in the following specification and claims.

In the drawing:

Fig. 1 is a diagrammatic view of a helicopter showing the arrangement of the rotor drive and the improved mounting and control means thereof;

Fig. 2 is a perspective detail view, with parts broken away, showing the general arrangement of the rotor with the drive shaft and the mounting means therefor;

Fig. 3 is a detail sectional view taken along the lines 3—3 of Fig. 2; and

Fig. 4 is a diagrammatic sectional view of a modification.

In Fig. 1, a helicopter body 10 supports an engine 12 that turns a shaft 14 connected to reduction gearing 16. A tail rotor 18 is driven by a shaft 20 turned by a high speed portion of the reduction gearing 16. A tubular rotor shaft 22 is turned by a low speed output end of the reduction gearing 16 through a splined slip joint 23.

One or more rotor blades 24 are mounted upon a rotor head 26 that is secured to and turned by the shaft 22. One or more rockable control links 28 are positioned by a rod 30 (Fig. 2) extending through the shaft 22, which rod is positioned by a total pitch control lever 32 in the cockpit of the helicopter body 10. Directional control for the helicopter is obtained with a rotatable tilt plate 34 rotatably mounted upon a second non-rotatable tilt plate 36 which is mounted on shaft 22 by the usual universal support and is

2 tilted by push-pull rods 38. Bell cranks 40 are mounted on a collar 42 rotatably secured on the shaft 22 and held so that as the shaft rotates the bell cranks 40 will not rotate. The bell cranks 40 are connected at their outermost ends with the push-pull rods 38 and at their innermost ends to cables or rods 44 that pass over suitable pulleys or bell cranks to a joy stick 46. The cables or rods 44 are pivotally mounted at points spaced from the shaft 22 so that as the collar 42 moves up and down with the shaft, the directional control of the helicopter will not be substantially affected.

A damper and shock absorber mechanism 50 has a housing 52 secured to the body 10 of the helicopter by suitable mounting brackets or bars or plates or the like 53, Fig. 3. A pump 54 for delivering oil, or other fluid, through a high pressure supply pipe 56 to the interior of the damper housing 52 is driven by the reduction gearing 16 at all times. An accumulator 58 is shown as made up of an upper hemispherical shell 60, a lower hemispherical shell 62 connected by a pipe 64 to the interior of housing 52 above piston 75, and a flexible diaphragm 66. The accumulator may be charged with air or other gas through a valve 67 in the upper chamber, and receive oil in the lower chamber. Any surges in the housing 52 will pass liquid through the pipe 64 to flex the diaphragm 66 to relieve shocks and provide a spring rate determined by the character of the air or other gas or springs, not shown, within the upper hemispherical shell 60. A sump 68 connects through a pipe 70 to the lower part of the housing 52 and at its bottom, and through a pipe 72 to the intake side of the pump 54.

The pump 54 delivers high pressure oil to the chamber 52 at its upper part to force a piston 75 secured to the shaft 22 into a desired position and to maintain a pressure sufficient to sustain the body 10 upon the upper surface of the piston 75. The piston 75 may have sufficient clearance within the chamber 52 so that oil can pass around the edge thereof and the rate of flow of oil past the edge will be determined by the pressure of the oil and the viscosity thereof. The interior surface of the chamber 52 may have a larger diameter at the bottom and taper to a smaller diameter at the top so that the piston 75 will normally occupy substantially the mid-position shown in Fig. 3 for a desired oil pressure. As the piston 75 moves higher into chamber 52, for a given load, less oil will bleed around the edges of the piston and a greater pressure will be built up to move the piston downwardly. As the piston moves downwardly, the area around the edge will be increased, the fluid will flow past the edge of the piston more readily, and the rotor blades 24 will urge the piston upwardly.

As the helicopter flies through the air, it will encounter gusts of air and air flowing in different directions which will cause the lift of the blades 24 to vary and tend to move the rotor head 26 with respect to the body 10. As the head 26 moves upwardly, the shaft 22 will be pulled upwardly to cause the fluid pressure in the chamber 52 above the piston 75 to be increased and charge the accumulator 58. At the same time, the rotor blade 24 will move upwardly with respect to the control rod 30 that maintains the total pitch of the blade 24. However, the inner end of the connecting link 28 will remain secured to the rod 30 in the same position, and through its connections 80 and 82 to the blade 24 will rock the same around a pivot mount 84 to reduce the pitch of the blade and hence lower the lift to cause the rotor blade to move downwardly and carry the shaft 22 down with it. As the shaft 22 moves downwardly, the pitch of the blade 24 will then be increased to that pitch desired.

As the pressure in the upper part of the chamber 52 increases with upward movement of the blades 24, the accumulator pressure will increase and oil will flow past piston 75 as a function of oil pressure and open area. As the piston returns to the desired central position, the accumulator 58 will first give up some of the stored energy, but for continued movement will exert substantially less force. If the movement of the piston 75 is large and fast, the oil may reverse in flow from the lower chamber to the upper chamber. Such flow is restricted by the piping to the sump 68, and by the resistance to fast flow around the piston 75, to obtain damping. The sump 68 is mounted above the lower portion of the chamber 52 so that that chamber will always be substantially full of oil. From the foregoing, it is to be noted that, for a given force applied upwardly, the accumulator 58 absorbs the force, some force is dissipated, and the return motion is damped at lower pressure conditions in the chamber 52.

During the occurrence of the above pitch changing, damping and shock absorbing functions, the cyclic pitch directional control of the rotor will remain substantially unchanged because, when the shaft 22 moves upwardly, the pitch of all blades is changed equally, therefore creating no interference with the action of the cyclic pitch control.

However, in that type of control wherein the total pitch and cyclic pitch are combined in moving the control members up and down around the shaft, a slightly different arrangement is required. Such an arrangement is shown in Fig. 4 and will now be explained.

A rotor blade 100 is mounted upon a shaft 102 by suitable means such as a mounting plate 104. A damper piston 175 operates within a chamber 152 connected to an accumulator 158 to damp and absorb vertical vibrations of the shaft 102. The details of construction of the damper mechanism will not be discussed because it may be substantially identical with that described above in connection with Figs. 1 to 3.

Control mechanism 110 comprises a tiltable, slideably movable plate 112 turned with the shaft 102, and a lower non-rotatable part positioned by levers 114 secured to a fixed part 116 of the helicopter. Thus, as the shaft 102 moves up and down, the control mechanism 110 will remain in the same position. However, the blade 100 will be tilted in a pitch reducing direction by its control connection 118 to the plate 112. It is seen from the above that the operation of this type of control system will be substantially the same as explained above in connection with Figs. 1 through 3, and that directional control will be substantially not affected by the automatic pitch reduction function, and that the damper will work in conjunction with the pitch reduction control linkage to provide a self-regulating automatically controlled system.

While I have shown and described two embodiments of my invention, it will be understood that many modifications will occur to those skilled in the art. For example, it would be obvious to apply the above system to the autorotative type aircraft, and it would also be obvious to change different parts to obtain slightly modified but generally similar functions. For these reasons, I wish not to be limited only to those forms described herein but by the scope of the following claims.

I claim:

1. In a helicopter, a body, means for lifting and sustaining said body including an upstanding drive shaft mounted for floating movement in said body, a rotor hub on said shaft, a lift producing rotor blade mounted on said hub for movement about its pitch changing axis to vary the lift thereof, and means for controlling the floating movement of said shaft including means responsive to the floating movement of said shaft to vary the pitch of said blade, cooperating housing and piston elements having clearance therebetween for the restricted passage of fluid, one of said elements being movable with said shaft and the other being carried by said body, said elements having cooperating wall portions the configuration of which is such that the cross sectional area of said restricted passage increases as said shaft moves downwardly, and means for supplying fluid under pressure to said housing above said piston.

2. In a helicopter, a body, means for lifting and sustaining said body including an upstanding shaft mounted for floating movement in said body, a rotor hub on said shaft, a lift producing rotor blade mounted on said hub for movement about its pitch changing axis to vary the lift thereof, and means for controlling the floating movement of said shaft including means responsive to vertical movement of said shaft to vary the pitch of said blade, a piston movable in response to movements of said shaft, a housing carried by said body having a downwardly and outwardly flared wall cooperating with said piston to provide a varying amount of clearance as said piston moves along said wall, and means for constantly supplying fluid under pressure to said housing above said piston.

3. In a helicopter, a body, means for lifting and sustaining said body including an upright drive shaft mounted for floating movement in said body, a rotor hub fixed to said shaft, a rotor blade mounted on said hub for movement about its pitch changing axis to vary the lift thereof, means for varying the pitch of said blade upon floating movement of said shaft including control means carried by said body having an operative connection with said blade, and means for controlling the floating movement of said shaft including a piston movable with the latter, a housing carried by said body and surrounding said piston having a downwardly and outwardly flared wall portion cooperating with said piston to provide a varying amount of clearance between said housing portion and piston, and means for constantly supplying fluid under pressure to said housing above said piston.

4. In a helicopter, a body, means for lifting and sustaining said body including an upright drive shaft mounted for floating movement in said body, a rotor hub fixed to said shaft, a rotor blade mounted on said hub for movement about its pitch changing axis to vary the lift thereof, means for varying the pitch of said blade in response to floating movement of said shaft including control means carried by said body and operatively connected to said blade, means for controlling the floating movement of said shaft including cooperating housing and piston elements having clearance therebetween for the restricted passage of fluid, one of said elements being movable with said shaft and the other being carried by said body, and one of said elements having a wall portion the configuration of which is such that the cross sectional area of the restricted passage between said piston and cylinder increases as said shaft moves downwardly, means for venting said housing below said piston, and means for continuously supplying fluid under pressure to said housing above said piston.

5. In a helicopter, a body, means for lifting and sustaining said body including an upright drive shaft mounted for floating movement in said body, a rotor hub fixed to said shaft adjacent its upper end, a rotor blade mounted on said hub for movement about its pitch changing axis, means for increasing the pitch of said blade upon downward movement of said shaft and decreasing the pitch of said blade upon upward movement of said shaft including control means carried by said body having an operative connection with said blade, means for controlling the floating movement of said shaft including a piston movable with the latter, a housing for said piston carried by said body having a downwardly and outwardly flared wall portion cooperating with said piston to provide a fluid passage therebetween which increases in cross section as said piston moves downwardly in said housing, means for venting said housing below said piston, and means having a driving connection with said shaft for supplying fluid under pressure to said housing above said piston whenever said shaft is rotating.

6. In a helicopter, a body, means for lifting and sustaining said body including an upright drive shaft mounted for floating movement in said body, a rotor hub fixed to said shaft adjacent its upper end, a rotor blade mounted on said hub for movement about its pitch changing axis, means for increasing the pitch of said blade upon downward movement of said shaft and decreasing the pitch of said blade upon upward movement of said shaft including control means carried by said body having an operative connection with said blade, means for controlling the floating movement of said shaft including a piston movable with the latter, a housing for said piston carried by said body having a flared wall portion cooperating with said piston to provide a fluid passage therebetween which increases in cross section as said piston moves downwardly in said housing, means for venting said housing below said piston, means for supplying fluid under pressure to said housing above said piston, and an accumulator comprising a casing having a diaphragm dividing said casing into a first chamber adapted to contain an expansible fluid and a second chamber having fluid communication with said housing above said piston.

7. In a helicopter, a body, an upright drive shaft mounted in said body for vertical floating movement, a rotor hub on said shaft, a rotor blade mounted on said hub for movement about a pitch changing axis to vary the lift thereof, and means for controlling the floating movement of said shaft including a piston on said shaft, a housing for said piston carried by said body having a flared wall portion cooperating with said piston to provide a varying amount of clearance between said piston and housing as said piston moves along said wall, means for increasing blade pitch upon downward movement of said shaft including blade pitch control means carried by said body having an operative connection to said blade, means for supplying fluid under pressure to said housing above said piston, and means for venting fluid from said housing beneath said piston.

8. In a helicopter, a body, an upright drive shaft mounted in said body for vertical floating movement, a rotor hub on said shaft, a rotor blade mounted on said hub for movement about a pitch changing axis to vary the lift thereof, and means for controlling the floating movement of said shaft including a piston on said shaft, a housing for said piston carried by said body having a downwardly and outwardly flared wall portion cooperating with said piston to provide an increasing amount of clearance between said piston and housing as said piston moves along said wall, means for increasing blade pitch upon downward movement of said shaft including blade pitch control means carried by said body having an operative connection to said blade, means for supplying fluid under pressure to said housing above said piston, means for venting fluid from said housing beneath said piston, a fluid accumulator having a fluid connection with said housing above said piston, and resilient means for opposing the passage of fluid from said housing into said accumulator.

9. In a helicopter, a body, an upright shaft mounted in said body for vertical floating movement, a rotor hub fixed to said shaft, a rotor blade mounted on said hub for movement about a pitch changing axis to vary the lift thereof, manually operable means carried by said body having an operative connection to said blade for varying the pitch thereof, whereby downward movement of said hub and shaft relative to said manually operable means effects pitch increase of said blade, means for controlling the floating movement of said shaft including a piston moved by said shaft and a housing for said piston carried by said body, said piston and a wall of said housing having provision for permitting a restricted flow of fluid past said piston which flow accelerates as said piston descends, means for venting said housing below said piston, means for supplying fluid under pressure to said housing above said piston, and a closed fluid accumulator having a diaphragm dividing it into two chambers, one of said chambers having a fluid connection with said housing above said piston and the other chamber containing an expansible fluid.

10. In aircraft, in combination, a body, means for sustaining said body in the air including an upstanding drive shaft mounted for floating movement in said body and a rotor blade mounted on the upper end of said shaft, means connecting said sustaining means and said body for absorbing and damping relative motions therebetween comprising housing and piston elements, one of which is carried by said body and the other of which is carried by said sustaining means, said elements having cooperating wall portions forming a restricted fluid passage which varies in its cross sectional area as said elements move relative to each other in response to floating movements of said shaft, means for supplying fluid under pressure to said housing to act on one side of said piston in a direction to oppose the lift forces created by said rotor blade, and means for venting said housing on the other side of said piston.

11. In aircraft, in combination, a body, means for sustaining said body in the air including an upstanding drive shaft mounted for floating movement in said body and a rotor blade mounted on the upper end of said shaft, means connecting said sustaining means and said body for absorbing and damping relative motions therebetween comprising housing and piston elements, one of which is carried by said body and the other of which is carried by said sustaining means, said elements having cooperating wall portions forming a restricted fluid passage which varies in its cross sectional area as said elements move relative to each other in response to floating movements of said shaft, means for supplying fluid under pressure to said housing to act on one side of said piston in a direction to oppose the lift forces created by said rotor blade, means for venting said housing on the other side of said piston, and an accumulator comprising a casing having a diaphragm dividing said casing into a first chamber adapted to contain an expansible fluid and a second chamber having fluid communication with said housing on said one side of said piston.

IGOR I. SIKORSKY.

REFERENCES CITED

The following references are of record in the file of this patent:

UNITED STATES PATENTS

| Number | Name | Date |
|---|---|---|
| 525,338 | Corneliussen | Sept. 4, 1894 |
| 624,352 | Lighthall | May 2, 1899 |
| 846,927 | Lasche | Mar. 12, 1907 |
| 1,298,630 | Schmidt | Mar. 25, 1919 |
| 1,879,935 | Hill | Sept. 27, 1932 |
| 2,352,186 | Corrigan | June 27, 1944 |
| 2,382,460 | Young | Aug. 14, 1945 |
| 2,410,176 | Magrum | Oct. 29, 1946 |

FOREIGN PATENTS

| Number | Country | Date |
|---|---|---|
| 311,472 | Great Britain | May 16, 1929 |
| 476,596 | Great Britain | Dec. 13, 1937 |
| 818,813 | France | Oct. 4, 1937 |